S. ROBERT.
MEANS FOR TRANSMITTING POWER.
APPLICATION FILED NOV. 26, 1915.
1,190,323.
Patented July 11, 1916.
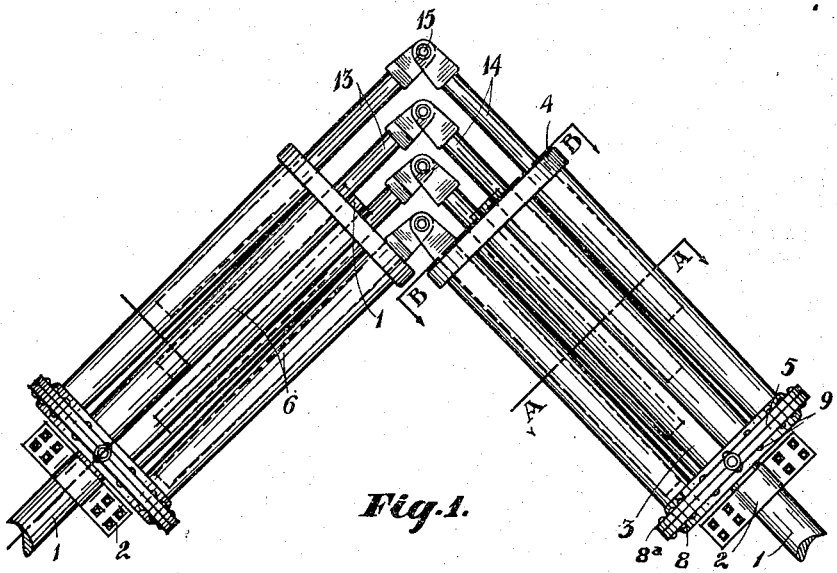
Fig. 1.
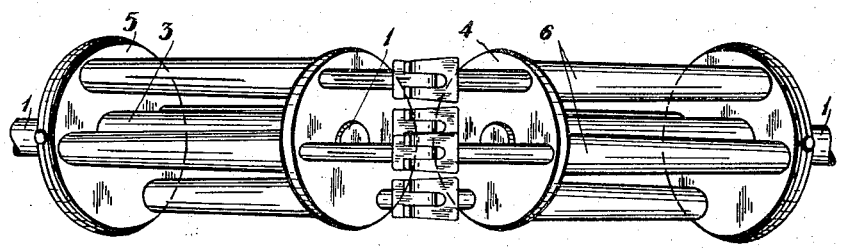
Fig. 2.
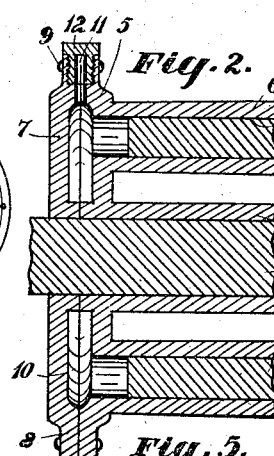
Fig. 3.
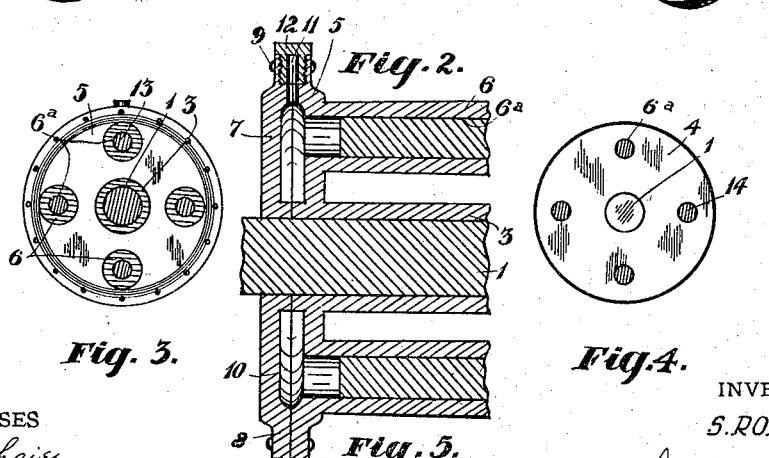
Fig. 5.
Fig. 4.
WITNESSES
L. Deshaies
D. Roze
INVENTOR
S. ROBERT
BY
Attorney

UNITED STATES PATENT OFFICE.

SIMON ROBERT, OF MONTREAL, QUEBEC, CANADA, ASSIGNOR TO ELPHÈGE MAHER, OF MONTREAL, QUEBEC, CANADA.

MEANS FOR TRANSMITTING POWER.

1,190,323.  Specification of Letters Patent.  Patented July 11, 1916.

Application filed November 26, 1915. Serial No. 63,518.

*To all whom it may concern:*

Be it known that I, SIMON ROBERT, a subject of the King of Great Britain, and residing at 38 William David street, in Maisonneuve, in the city of Montreal, in the Province of Quebec, in the Dominion of Canada, have invented certain new and useful Improvements in Means for Transmitting Power; and I do hereby declare that the following is a full, clear, and exact description of the same.

The invention relates particularly to improvements in "means for transmitting power" from a driving shaft to a driven member, disposed at any suitable angle thereto.

The object of the invention is to provide means whereby a driving shaft can transmit power to another shaft at any angle up to 90 degrees or more and also to provide suitable means for oiling.

A practical embodiment of the invention is represented in the accompanying drawings forming part of this specification, in which similar characters of reference indicate corresponding parts in all views.

Figure 1 is a plan view of a driving shaft operatively connected according to the invention to a driven shaft. Fig. 2 is a perspective view of the invention. Fig. 3 is a cross-section on line A—A in Fig. 1. Fig. 4 is a cross-section on line B—B in Fig. 1, and Fig. 5 is a cross-section through a portion of the oil well.

1 is a driving shaft which may be operatively connected to any suitable source of power not shown in the drawings. The said shaft 1 may be suitably journaled in the bearing 2, and 3 is a hub mounted on said shaft and locked thereto by any suitable means, preferably a key. The said hub has at one end the circular flange 4 and at the other end a similar flange 5, centrally depressed. Between said flanges 4 and 5, circumferentially disposed around their outer edge, are a plurality of cylinders 6, preferably 5 in number, and 6$^a$ is a bore in said cylinders communicating with a corresponding bore or aperture in the flanges 4 and 5, and 7 is a circular plate having a corresponding depression to that of the circular plate 5, each of said plates being provided with flanges 8 and 8$^a$ secured together by means of the bolts 9. The central depression in each of said plates forms a recess or well 10, and 11 is a hole provided between said flanges 8 and 8$^a$, and 12 is a cap adapted to close said opening.

13 and 14 are rods or pistons adapted to slide in said bore 6$^a$ in said cylinders 6, said rods 13 and 14 being pivotally connected together at 15 by any suitable means.

Before the operation of the invention is disclosed, it may be here stated that the well 10 must be filled with a suitable lubricant through the hole 11 and the cap 12 is then screwed on said hole in order to keep the oil in the well.

It will be very clearly seen that the rods 13 and 14 will press and suck alternately the oil in the cylinders 6 and thereby reduce friction considerably.

In the operation of the invention, the driving shaft which is rotated by any suitable means will also rotate the hub 3 secured thereto, and the rods 13 and 14 being pivotally connected together, said hub will thereby impart to said rods a to and fro movement in the cylinders 6, which are fixed to the hub and rotate therewith.

As above stated the rods in their to and fro movement will cause the oil contained in the well 10 to circulate from one cylinder to the other, thereby securing maximum efficiency from the device.

The torque movement imparted to the rods 13 rotate the rods 14, which are pivotally connected to said rods 13, thereby rotating the driven shaft, no matter if the said driving and driven shafts are at an angle of 90 degrees or more.

The invention can be used in drills or other portable tools by slightly changing minor parts without departing from the invention.

What I claim as my invention is:

1. The combination with a driving shaft, a driven shaft supported in angular relation to said driving shaft, a hub secured on each of said shafts having at one end a circular flange provided with a plurality of apertures arranged circumferentially, and at the other end a well, a plurality of cylinders secured between said circular flanges and wells and communicating with said wells at one end and rods sliding in said cylinders and pivotally connected at their outer ends, substantially as described.

2. The combination with a driving shaft, a driven shaft supported in angular relation to said driving shaft, a hub rigidly mounted on each of said shafts, having at one end a circular flange provided with a plurality of circumferential apertures, and at the other end with a circular flange also provided with a plurality of apertures arranged circumferentially and being centrally depressed, a circular disk secured to said circular flange having a corresponding central depression, thus forming an oil well, a plurality of cylinders secured between said circular flanges and communicating with said apertures in said flange at one end and communicating with said well at the other end, and rods sliding in said cylinders pivotally connected at their outer ends, substantially as described.

3. The combination with a driving shaft, a driven shaft supported in angular relation to said driving shaft, a hub secured on each of said shafts having at one end a circular flange provided with a plurality of apertures arranged circumferentially and at the other end with a circular flange also provided with a plurality of apertures and centrally depressed, a circular disk provided with a corresponding central depression, the outer edge forming a flange registering with said centrally depressed circular flange and forming a well therebetween, means to secure said circular flange and disk together, said disk having an aperture to introduce lubricants and means to close said aperture, a plurality of cylinders secured between said circular flanges and communicating with the apertures therein and at the other end communicating with said well formed between the circular flange and disk, and rods sliding in said cylinders and pivotally connected at their outer ends substantially as described.

Signed at Montreal, Quebec, Canada, this 28th day of October, 1915.

SIMON ROBERT.

Witnesses:
D. ROSE,
C. LEFEBRE.

Copies of this patent may be obtained for five cents each, by addressing the "Commissioner of Patents, Washington, D. C."